United States Patent
Aida et al.

(10) Patent No.: US 7,215,260 B2
(45) Date of Patent: May 8, 2007

(54) DATA RECORDING MEDIUM, DATA RECORDING METHOD, AND DEVICE

(75) Inventors: Toru Aida, Kanagawa (JP); Yoichiro Sako, Tokyo (JP); Tatsuya Inokuchi, Tokyo (JP); Akiya Saito, Kanagawa (JP); Takashi Kihara, Chiba (JP); Tatsushi Sano, Kanagawa (JP); Yoriaki Kanada, Kanagawa (JP); Yoshiro Miyoshi, Kanagawa (JP); Shunsuke Furukawa, Tokyo (JP); Yoshinobu Usui, Kanagawa (JP); Toshihiko Senno, Kanagawa (JP)

(73) Assignee: Sony Corporation, Tokyo (JP)

( * ) Notice: Subject to any disclaimer, the term of this patent is extended or adjusted under 35 U.S.C. 154(b) by 211 days.

(21) Appl. No.: 10/488,206

(22) PCT Filed: Jun. 27, 2003

(86) PCT No.: PCT/JP03/08182

§ 371 (c)(1),
(2), (4) Date: Jul. 29, 2004

(87) PCT Pub. No.: WO2004/006253

PCT Pub. Date: Jan. 15, 2004

(65) Prior Publication Data

US 2006/0202869 A1    Sep. 14, 2006

(30) Foreign Application Priority Data

Jul. 5, 2002    (JP)    ............................. 2002-196874

(51) Int. Cl.
*H03M 7/00*    (2006.01)

(52) U.S. Cl. .......................................... 341/59; 341/58

(58) Field of Classification Search .................. 341/58, 341/59; 369/44.26, 53.15, 47.1, 47.3
See application file for complete search history.

(56) References Cited

U.S. PATENT DOCUMENTS 6,301,208 B1 *  10/2001  Sugaya et al. ............. 369/47.1
6,628,583 B1 *   9/2003  Van Den Enden et al. 369/47.1

FOREIGN PATENT DOCUMENTS

| JP | 9-288864 | 11/1997 |
|----|----------|---------|
| JP | 2002-175662 | 6/2002 |
| JP | 2002-279732 | 9/2002 |

* cited by examiner

*Primary Examiner*—Brian Young
(74) *Attorney, Agent, or Firm*—Oblon, Spivak, McClelland, Maier & Neustadt, P.C.

(57) ABSTRACT

Six record areas for predetermined data that has been encoded and digitally modulated are formed in a data record area on a disc. The record areas have different offset compensation amounts. The offset compensation amounts allow all offset amounts that may take place in an error correction code encoder to be compensated. Thus, regardless of the offset amount generated by the error correction code encoder, encoded and modulated data that has been generated by the conventional EFM modulating system and recorded in one of the record areas securely causes DSV to deviate. Each of the record areas is set to a sufficient length that allows the effect of which DSV deviates to be recognized.

6 Claims, 15 Drawing Sheets

Fig. 1A ENCODER THAT HAS NO OFFSET

DATA THAT HAS NOT BEEN ENCODED:

| D1 | D2 | D3 | D4 | D5 | D6 | D7 | D8 | D9 | D10 | D11 | D12 | D13 | D14 | D15 | D16 | D17 | D18 | D19 | D20 | D21 | D22 | D23 | D24 |

Fig. 1B

DATA THAT HAS BEEN ENCODED:

| D1 | D2 | D3 | D4 | D5 | D6 | D7 | D8 | D9 | D10 | D11 | C2 | C2 | C2 | C2 | D13 | D14 | D15 | D16 | D17 | D18 | D19 | D20 | D21 | D22 | D23 | D24 |

EXAMPLE OF ENCODER THAT HAS OFFSET (OF FOUR SYMBOLS)

Fig. 1C

DATA THAT HAS NOT BEEN ENCODED:

| D5 | D6 | D7 | D8 | D9 | D10 | D11 | D12 | D13 | D14 | D15 | D16 | D17 | D18 | D19 | D20 | D21 | D22 | D23 | D24 | D1 | D2 | D3 | D4 |

Fig. 1D

DATA THAT HAS BEEN ENCODED:

| D5 | D6 | D7 | D8 | D9 | D10 | D11 | D12 | D13 | D14 | D15 | C2 | C2 | C2 | C2 | D16 | 1' | 2' | 3' | 4' | D17 | D18 | D19 | D20 | D21 | D22 | D23 | D24 | 1 | 2 | 3 | 4 |

Fig. 3A DATA ARRANGEMENT OF A AREA

| D 1 | D 2 | D 3 | D 4 | D 5 | D 6 | D 7 | D 8 | D 9 | D 10 | D 11 | D 12 | D 13 | D 14 | D 15 | D 16 | D 17 | D 18 | D 19 | D 20 | D 21 | D 22 | D 23 | D 24 |
| D 1 | D 2 | D 3 | D 4 | D 5 | D 6 | D 7 | D 8 | D 9 | D 10 | D 11 | D 12 | D 13 | D 14 | D 15 | D 16 | D 17 | D 18 | D 19 | D 20 | D 21 | D 22 | D 23 | D 24 |
| D 1 | D 2 | D 3 | D 4 | D 5 | D 6 | ... | | | | | | | | | | | | | | | | | |

Fig. 3B DATA ARRANGEMENT OF B AREA

| D 21 | D 22 | D 23 | D 24 | D 1 | D 2 | D 3 | D 4 | D 5 | D 6 | D 7 | D 8 | D 9 | D 10 | D 11 | D 12 | D 13 | D 14 | D 15 | D 16 | D 17 | D 18 | D 19 | D 20 |
| D 21 | D 22 | D 23 | D 24 | D 1 | D 2 | D 3 | D 4 | D 5 | D 6 | D 7 | D 8 | D 9 | D 10 | D 11 | D 12 | D 13 | D 14 | D 15 | D 16 | D 17 | D 18 | D 19 | D 20 |
| D 21 | D 22 | D 23 | D 24 | D 1 | D 2 | ... | | | | | | | | | | | | | | | | | |

Fig. 7

| | | DATA BITS | | | | | | | | CHANNEL BITS | | | | | | | | | | | | | | |
|---|---|---|---|---|---|---|---|---|---|---|---|---|---|---|---|---|---|---|---|---|---|---|---|---|
| | | d1 | | | | | | | d8 | d1 | | | | | | | | | | | | | | c14 |
| 00 | 0 | 0 | 0 | 0 | 0 | 0 | 0 | 0 | 0 | 0 | 1 | 0 | 0 | 1 | 0 | 0 | 0 | 1 | 0 | 0 | 0 | 0 | 0 |
| 01 | 1 | 0 | 0 | 0 | 0 | 0 | 0 | 0 | 1 | 1 | 0 | 0 | 0 | 0 | 1 | 0 | 0 | 0 | 0 | 0 | 0 | 0 | 0 |
| 02 | 2 | 0 | 0 | 0 | 0 | 0 | 0 | 1 | 0 | 1 | 0 | 0 | 1 | 0 | 0 | 0 | 0 | 1 | 0 | 0 | 0 | 0 | 0 |
| 03 | 3 | 0 | 0 | 0 | 0 | 0 | 0 | 1 | 1 | 1 | 0 | 0 | 0 | 1 | 0 | 0 | 0 | 1 | 0 | 0 | 0 | 0 | 0 |
| ⋮ | ⋮ | | | | | ⋮ | | | | | | | | | | ⋮ | | | | | | | |
| 80 | 128 | 1 | 0 | 0 | 0 | 0 | 0 | 0 | 0 | 0 | 1 | 0 | 0 | 1 | 0 | 0 | 0 | 1 | 0 | 0 | 0 | 0 | 1 |
| 81 | 129 | 1 | 0 | 0 | 0 | 0 | 0 | 0 | 1 | 1 | 0 | 0 | 0 | 0 | 1 | 0 | 0 | 1 | 0 | 0 | 0 | 0 | 1 |
| 82 | 130 | 1 | 0 | 0 | 0 | 0 | 0 | 1 | 0 | 1 | 0 | 0 | 1 | 0 | 0 | 0 | 0 | 1 | 0 | 0 | 0 | 0 | 1 |
| 83 | 131 | 1 | 0 | 0 | 0 | 0 | 0 | 1 | 1 | 1 | 0 | 0 | 0 | 1 | 0 | 0 | 0 | 1 | 0 | 0 | 0 | 0 | 1 |
| ⋮ | ⋮ | | | | | ⋮ | | | | | | | | | | ⋮ | | | | | | | |
| 8C | 140 | 1 | 0 | 0 | 0 | 1 | 1 | 0 | 0 | 0 | 1 | 0 | 0 | 0 | 0 | 0 | 1 | 0 | 0 | 0 | 0 | 0 | 1 |
| ⋮ | ⋮ | | | | | ⋮ | | | | | | | | | | ⋮ | | | | | | | |
| 98 | 152 | 1 | 0 | 0 | 1 | 1 | 0 | 0 | 0 | 0 | 1 | 0 | 0 | 1 | 0 | 0 | 0 | 0 | 0 | 0 | 0 | 0 | 1 |
| ⋮ | ⋮ | | | | | ⋮ | | | | | | | | | | ⋮ | | | | | | | |
| B8 | 184 | 1 | 0 | 1 | 1 | 1 | 0 | 0 | 0 | 0 | 1 | 0 | 0 | 1 | 0 | 0 | 0 | 0 | 0 | 1 | 0 | 0 | 1 |
| ⋮ | ⋮ | | | | | ⋮ | | | | | | | | | | ⋮ | | | | | | | |
| BA | 186 | 1 | 0 | 1 | 1 | 1 | 0 | 1 | 0 | 1 | 0 | 0 | 1 | 0 | 0 | 0 | 0 | 0 | 0 | 1 | 0 | 0 | 1 |
| ⋮ | ⋮ | | | | | ⋮ | | | | | | | | | | ⋮ | | | | | | | |
| C9 | 201 | 1 | 0 | 1 | 1 | 1 | 0 | 0 | 0 | 1 | 0 | 0 | 0 | 0 | 1 | 0 | 0 | 0 | 0 | 0 | 0 | 0 | 1 |
| ⋮ | ⋮ | | | | | ⋮ | | | | | | | | | | ⋮ | | | | | | | |
| E2 | 226 | 1 | 0 | 1 | 1 | 1 | 0 | 1 | 0 | 1 | 0 | 0 | 0 | 0 | 1 | 0 | 0 | 0 | 1 | 0 | 0 | 1 | 0 |

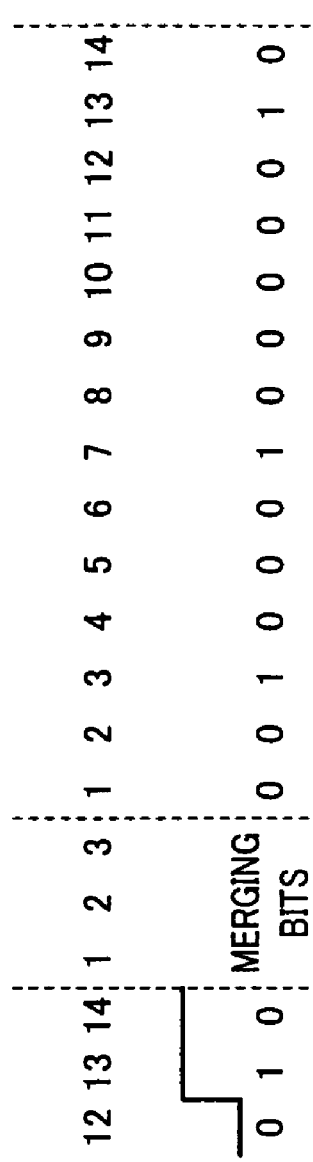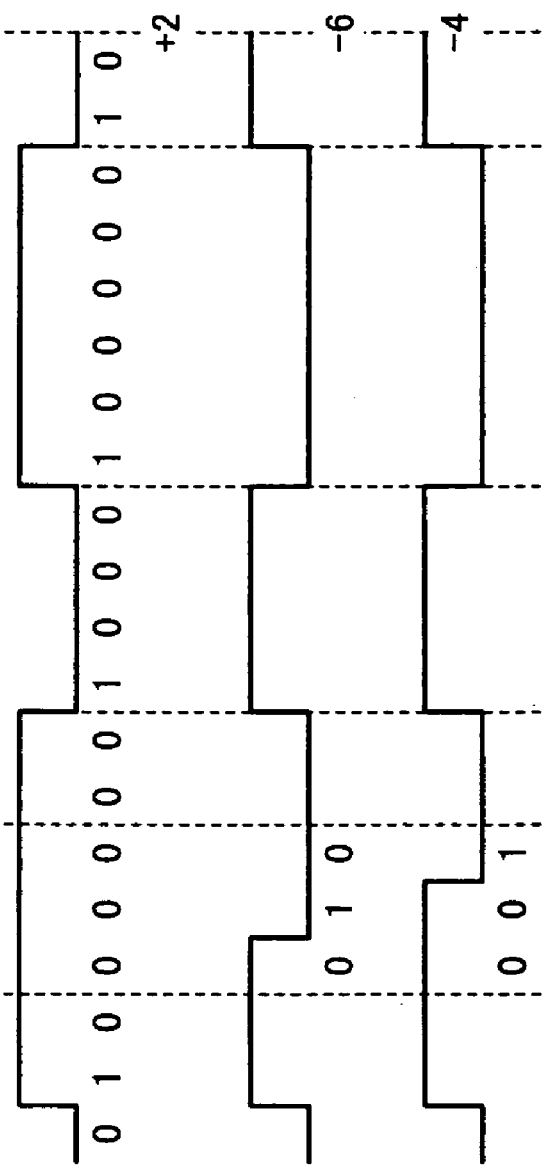
Fig. 8A
Fig. 8B
Fig. 8C
Fig. 8D

| SY | 81 | FB | FA | FB | FA | FB | FA | FB | BA | FB | BB | E2 | A9 | 9A | 70 | FB | BB | FB | FA | FB | BA | 6A | AA | D1 | F1 |
| SY | 81 | FB | FA | FB | FA | FB | FA | FB | BA | FB | BB | E2 | A9 | 9A | 70 | FB | BB | FB | FA | FB | BA | 6A | AA | D1 | F1 |
| SY | 81 | FB | FA | FB | BB | FB | BB | FB | BA | FB | BB | E2 | 81 | 9A | B9 | FB | BA | FB | FA | FB | BA | 6A | AA | D1 | F1 |
| SY | 81 | FB | FA | FB | BB | FB | BB | FB | BA | FB | BB | 7A | 81 | E2 | B9 | FB | BA | FB | FA | FB | BA | 6A | AA | D1 | F1 |
| SY | 81 | FB | FA | FB | BB | FB | BB | FB | BA | FB | BB | 7A | 81 | E2 | B9 | FB | BA | FB | FA | FB | BA | 6A | AA | D1 | F1 |
| SY | 81 | FB | FA | FB | BB | FB | BB | FB | BA | FB | BB | 7A | 81 | E2 | B9 | FB | BA | FB | FA | FB | BA | 6A | AA | D1 | F1 |
| SY | 81 | FB | FA | FB | FA | FB | FA | FB | BA | FB | BB | E2 | A9 | 9A | 70 | FB | BB | FB | FA | FB | BA | 6A | AA | D1 | F1 |
| SY | 81 | FB | FA | FB | FA | FB | FA | FB | BA | FB | BB | E2 | A9 | 9A | 70 | FB | BB | FB | FA | FB | BA | 6A | AA | D1 | F1 |

DATA RECORDING MEDIUM, DATA RECORDING METHOD, AND DEVICE

TECHNICAL FIELD

The present invention relates to a data recording medium, a data recording method, and a data recording apparatus applicable to for example a read-only-memory (ROM) type optical disc.

BACKGROUND ART

Since optical discs such as Compact Disc Digital Audio (CD-DA) discs and Compact Disc Read Only Memory (CD-ROM) discs are easy to handle and their production cost is relatively low, they have been widely used as recording mediums that store data. Moreover, in recent years, Compact Disc Recordable (CD-R) discs that allow data to be written once and Compact Disc Rewritable (CD-RW) discs that allow data to be rerecorded have come out. Data can be easily recorded on such discs. Thus, optical discs based on the CD standard such as CD-DA discs, CD-ROM discs, CD-R discs, and CD-RW discs have become the mainstream of data recording mediums. Furthermore, in recent years, technologies for compressing audio data in accordance with the MPEG1 Audio Layer-3 (MP3) system and the Adaptive Transform Acoustic Coding (ATRAC) system and recording the compressed data on a CD-ROM disc, a CD-R disc, a CD-RW disc, or the like has been used.

However, as CD-R discs and CD-RW discs have come out, data recorded on a CD can be easily copied to such discs. Thus, there is a problem about copyright protection. As a result, when content data is recorded on a disc such as a CD disc, it is necessary to take countermeasures for protecting content data against copyright infringers.

FIG. 15 schematically shows a process of a copy operation. A reproducing unit designated by reference numeral 41 reproduces content data from an original disc for example a CD 42. Reference numeral 43 represents an optical pickup. Reference numeral 44 represents a reproduction signal process portion. Reproduction data reproduced by the reproducing unit 41 is supplied to a recording process portion 52 of a recording unit 51. An optical pickup 53 records the reproduction data to an optical disc for example a CD-R 54. The content data recorded on the CD 42 is recorded to the CD-R 54. In such a manner, with the reproducing unit 41 and the recording unit 51, a copy disc of the CD 42, which is an original disc, can be easily produced.

When a CD is used, as shown in FIG. 16, in the reproducing process portion 44, a sync detecting portion 46 detects a frame sync from a reproduction signal received from an input terminal 45. An EFM demodulator 47 demodulates the reproduction signal in accordance with the Eight to Fourteen Modulation (EFM) system and supplies the EFM-demodulated reproduction data to a Cross Interleave Reed-Solomon Code (CIRC) decoder 48. The CIRC decoder 48 corrects errors of the EFM-demodulated reproduction data. In the EFM system, each symbol (eight data bits) is converted into 14 channel bits. Three merging bits are added between two sequences of 14 channels bits. A sub code decoder 49 decodes a sub code from the reproduction data and obtains a reproduction sub code.

FIG. 17 shows an outlined structure of the recording process portion 52. Data to be recorded is supplied from an input terminal 55 to a CIRC encoder 56. The CIRC encoder 56 encodes the data in accordance with the CIRC system. In addition, a sub code is supplied from an input terminal 57 to a sub code encoder 58. The sub code encoder 58 converts the sub code in a sub code format. An output of the CIRC encoder 56 and an output of the sub code encoder 58 are supplied to a multiplexer 60. In addition, a frame sync is supplied from an input terminal 59 to the multiplexer 60. The multiplexer 60 arranges the input data of the three types in a predetermined sequence. An output of the multiplexer 60 is supplied to an EFM modulator 61. The EFM modulator 61 performs an EFM modulating process for the multiplexed data.

As one method for protecting content data recorded on a CD disc, it is determined whether or not a disc is an original disc or a copy disc on which data of an original disc has been copied. When a disc is an original disc, its content data can be permitted to be copied to another disc. In contrast, when a disc is a copy disc, its content data can be prohibited form being further copied to another disc.

To determine whether a disc is an original disc or a copy disc, a method for inserting a defect into a master disc upon production thereof, detecting the defect from a disc upon reproduction of an original disc, and determines whether the disc is an original disc or a copy disc with the defect has been proposed. However, in this method, such a defect is contained in an original disc. In addition, depending on the type of a defect that is contained in a disc, the defect may be directly copied to a CD-R disc.

The applicant of the present invention has filed a patent application of an invention about a data recording medium, a data recording method, and an apparatus that allow a disc to be determined whether it is an original disc or a copy disc without need to intentionally insert a defect in the original disc so as to prevent content data of an original disc from being copied (as Japanese Patent Application No. 2002-105278).

According to the invention of the prior patent application, a copy protection is performed using Digital Sum Variation (DSV). In other words, by recording predetermined data to an original disc, although its content data can be normally reproduced, since the predetermine data causes the DSV to deviate, content data cannot be normally reproduced from a copy disc such as a CD-R disc to which the content data has been copied from the original data.

When data is recorded on a disc, a plurality of symbols, for example, 24 symbols are encoded with an error correction code. A plurality of parities, for example, four parities are added to the data. Likewise, the predetermined data that causes the DSV to deviate is encoded with an error correction code and the parities are added thereto. The data to which the parities have been added causes the DSV to deviate.

In a conventional error correction code encoder, the phases of 24 symbol to be encoded are not specially designated. When the 24 symbols of the predetermined data having a particular phase (offset is 0) are encoded with an error correction code, the encoded data causes the DSV to deviate. However, when the phase of the predetermined data deviates and the offset thereof is not 0, the generated parities may be different from those generated when the offset is 0. As a result, the data that has been encoded with the error correction code may not cause the DSV to deviate.

DISCLOSURE OF THE INVENTION

Therefore, an object of the present invention is to provide a data recording medium on which data of a pattern that securely and switchably causes the DSV to deviate even if there is an offset in the error correction code encoding, a data recording method thereof, and an apparatus thereof.

To solve the foregoing problem, the present invention is a data recording medium on which data encoded with an error correction code is digitally modulated and recorded, wherein predetermined data contained in a part of data to be recorded is data that switchably causes DSV to deviate, and wherein data of which the predetermined data has been encoded with the error correction code and modulated is recorded a plurality of times at different start positions.

The present invention is a data recording method for digitally modulating data encoded with an error correction code and recording the digitally modulated data on a data recording medium, the method comprising the steps of:

inserting predetermined that switchably causes DSV to deviate into data to be recorded, and recording data of which the predetermined data has been encoded with the error correction code and modulated a plurality of times at different start positions.

The present invention is a data recording apparatus for digitally modulating data encoded with an error correction code and recording the digitally modulated data on a data recording medium, the apparatus comprising:

means for inserting predetermined that switchably causes DSV to deviate into data to be recorded, and means for recording data of which the predetermined data has been encoded with the error correction code and modulated a plurality of times at different start positions.

According to the present invention, even if there is an offset in an error correction code encoder, so as to securely and switchably cause the DSV to deviate, the predetermined data is recorded a plurality of times at different start positions thereof.

BRIEF DESCRIPTION OF DRAWINGS

FIG. 1A to FIG. 1D are schematic diagrams describing an offset that takes place in an error correction code encoder.

FIG. 3A and FIG. 3B are schematic diagrams describing the recording method according to the embodiment of the present invention.

FIG. 7 is a schematic diagram showing a part of an EFM conversion table.

FIG. 8A to FIG. 8D are schematic diagrams showing merging bits.

FIG. 9 is a schematic diagram showing an example of a predetermined data pattern according to the present invention.

FIG. 10 is a schematic diagram showing data of which an example of the predetermined data pattern has been encoded in accordance with the CIRC system and a frame synchronous signal and a sub code have been added thereto.

FIG. 13 is a schematic diagram showing another example of the predetermined data pattern according to the present invention.

FIG. 14 is a schematic diagram showing data in the case that the other example of the predetermined data pattern has been encoded in accordance with the CIRC system and a frame synchronous signal and a sub code have been added thereto.

BEST MODES FOR CARRYING OUT THE INVENTION

Next, an embodiment of the present invention will be described. FIG. 1A to FIG. 1D describe an offset of an error correction code encoder. FIG. 1A and FIG. 1B show data that has not been encoded by the encoder having no offset and data that has been encoded by the encoder. 24 symbols D1 to D24 are encoded with an error correction code that is a Reed-Solomon code. When the data is encoded by the encoder, four parity symbols $C2_1$ to $C2_4$ are generated and placed at a center portion of the first 12 symbols D1 to D12 and the last 12 symbols. The symbols have a proper length such as a word or a byte. For example, one symbol is one byte. 24 symbols are grouped as a set. A data sequence of which a predetermined number of sets are connected is encoded in accordance with area correction code encoding system and then modulated.

FIG. 1C and FIG. 1D show data that has not been encoded by an encoder having an offset of for example four symbols and data that has been encoded by the encoder. 24 symbols are designated by reference codes D1 to D24. When there is an offset of four symbols, 24 symbols of which 20 symbols D5 to D24 are followed by four symbols D1 to D4 are encoded. After the 24 symbols have been encoded, as shown in FIG. 1D, parity symbols $C2_1'$ to $C2_4'$ are generated. Since the symbols D1 to D24 are not the same data each other, due to the offset of four symbols, symbols to be encoded become different. As a result, generated parity symbols $C2_1'$ to $C2_4'$ are different from $C2_1$ to $C2_4$, respectively. The predetermined data D1 to D24 are digitally modulated, for example, modulated in accordance with the EFM system and recorded on a disc.

When the predetermined data D1 to D24 are recorded on the disc, they switchably allow the DSV to deviate. In other words, when predetermined data is encoded with an error correction code and modulated in accordance with the conventional EFM modulating system, the data causes the DSV to deviate. In contrast, when such data is modulated in accordance with the EFM modulating system according to the present invention, the data allows the DSV not deviate. The DSV would deviate on both the + side and − side. In other words, even if the parity symbols $C2_1$ to $C2_4$ are inserted into two adjacent sets of 12 symbols, the predetermined data causes the DSV to deviate. Thus, when different parity symbols C21' to C24' are inserted between two adjacent sets of 12 symbols, when the predetermined data is modulated in accordance with the EFM system, the predetermined data does not securely cause the DSV to deviate. As a result, the object of the present invention that cause the DSV to deviate, namely, the copy protection cannot be accomplished.

Figure 2:
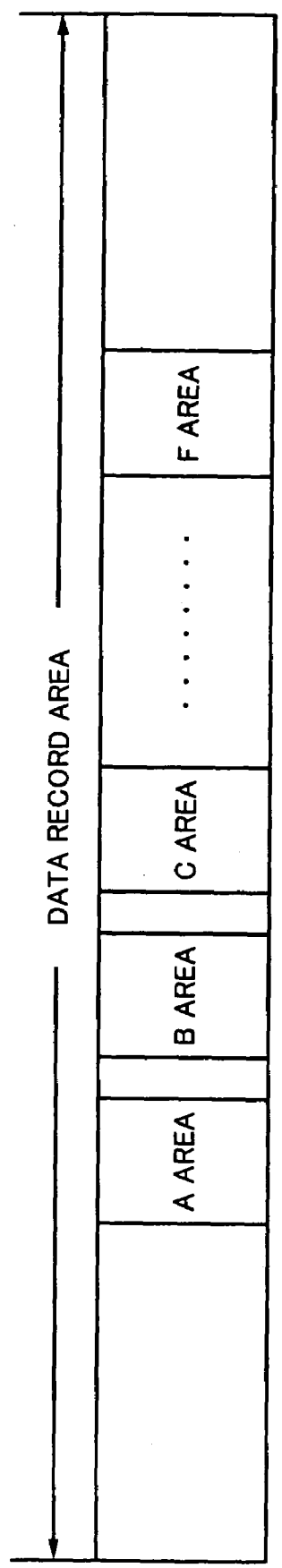
FIG. 2 is a schematic diagram describing a recording method according to an embodiment of the present invention.

Next, with reference to FIG. 2, a recording method according to the present invention will be described. A plurality of record areas, for example, six areas for predetermined data that has been encoded and digitally modulated are disposed in a data record area of a disc (hereinafter, the predetermined data is referred to as encoded and modulated data). These record areas are referred to as A area, B area, ..., and F area. These record areas have different offset compensation amounts from each other. In this example, it is assumed that the offset compensation amount of the A area is 0; the offset compensation amount of the B area is 4; the offset compensation amount of the C area is 8; the offset compensation amount of the D area is 12; the offset compensation amount of the E area is 16; and the offset compensation amount of the F area is 20.

With these six offset compensation amounts, all offset amounts that might take place in the error correction code encoder can be compensated. Thus, regardless of the amount of an offset that takes place in the error correction code encoder, when encoded and modulated data that has been generated by the conventional recording encoder and recorded in any one of the record areas is modulated in accordance with the conventional EFM modulating system, the encoded and modulated data securely causes the DSV to deviate. The length of each record area is set to a sufficient length for which the effect of which the DSV deviates can be recognized. In addition, the positions of the record areas are dispersed on the disc.

According to the embodiment of the present invention, an offset takes place in the unit of four symbols. Of course, the number of record areas can be set corresponding to the unit of other than four symbols. According to the embodiment, like an error correction code encoder for a CD, audio data of two-channel stereo is encoded with an error correction code. In a CD, one sample of audio data is composed of 16 bits. Samples of left and right channels are processed in pairs. In other words, since samples are processed in the unit of (32 bits=4 symbols), an offset takes place in the unit of four symbols.

FIG. 3A and FIG. 3B show data arrangements of the A area and the B area, respectively. As an example, it is assumed that the offset amount of the error correction code encoder is 0. In this case, as shown in FIG. 3A; data recorded in the area A does not have an offset. Thus, when encoded and modulated data recoded in the A area is modulated in accordance with the conventional EFM modulation system, the resultant data causes the DSV to deviate. In contrast, as shown in FIG. 3B, the data recoded in the area B has an offset. Thus, the encoded and modulate data recorded in the B area does not securely cause the DSV to deviate. If the offset amount is 4 as shown in FIG. 1C, the encoded and modulated data recorded in the B area does not have an offset.

As described above, according to the present invention, even if any encoder that has any offset is used, a pattern that securely causes the DSV to deviate can be recorded on a disc. In the foregoing example, the predetermined data of 24 symbols D1 to D4 is repeated. However, it should be noted that such data is an example. Alternatively, the predetermined data may be composed of any number of symbols other than 24 symbols. The error correction code encoding is performed in the unit of 24 symbols so that the C2 code can be applied to a CD. Thus, the error correction code encoding may be performed in the unit of other than 24 symbols.

Figure 4:
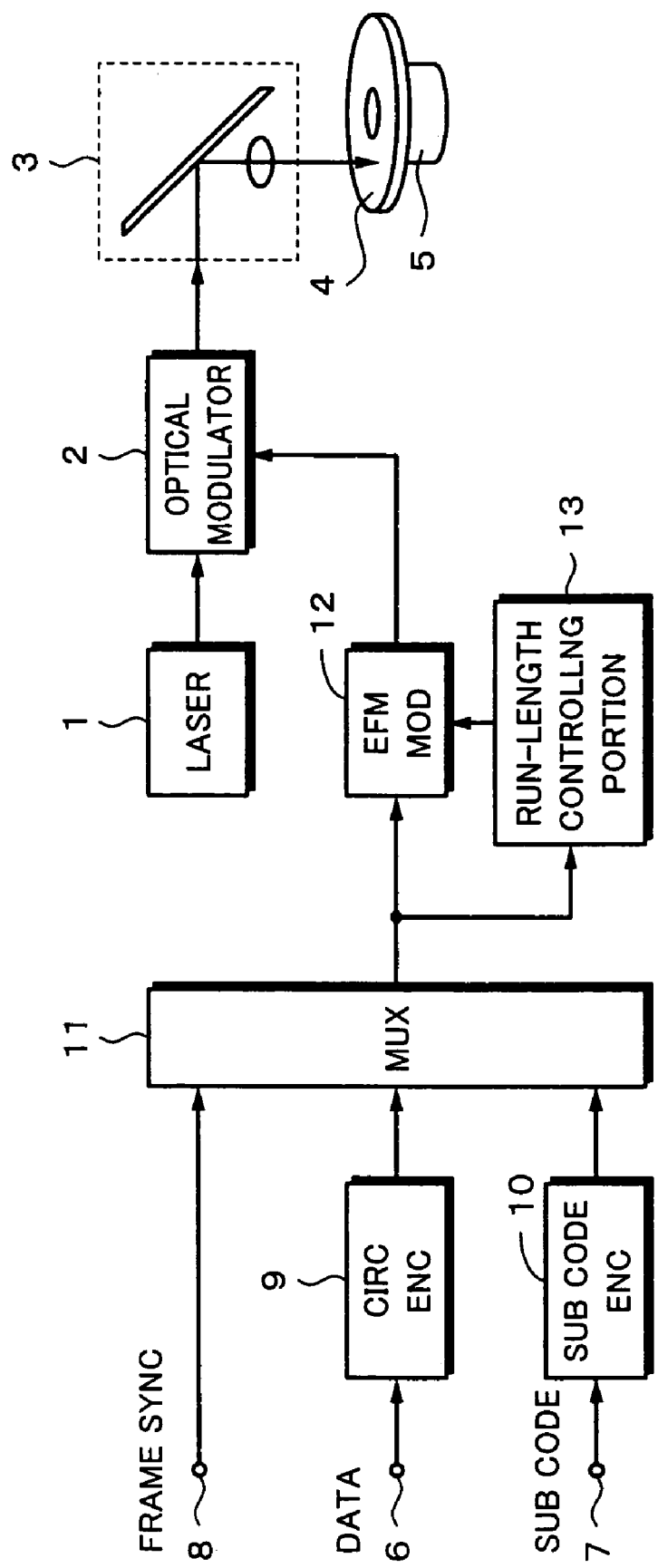
FIG. 4 is a block diagram showing an example of a structure of a mastering unit according to the embodiment of the present invention.

For easy understanding of the foregoing present invention, an example of which data that switchably allows the DSV to deviate is recorded on a read-only disc such as a CD will be described. FIG. 4 shows an example of a structure of a mastering unit that produces a data recording medium according to the present invention. The mastering unit has a laser 1, an optical modulator 2, and an optical pickup 3. The laser 1 is a gas laser such as Ar ion laser, He—Cd laser, or Kr ion laser, or a semiconductor laser. The optical modulator 2 is of acoustic optical effect type or electric optical type. The optical modulator modulates laser light irradiated from the laser 1. The optical pickup 3 is a recording means that has an objective lens and so forth. The objective lens collects laser light that passes through the optical modulator 2 and irradiates the collected laser light on a photoresist surface of a glass original 4 on which a photoresist that is a photosensitive material is coated.

The optical modulator 2 modulates the laser light irradiated by the laser 1 corresponding to a record signal. The mastering unit irradiates the modulated laser light on the glass original 4 so as to produce a master on which the data has been recorded. A servo portion (not shown) is disposed. The servo portion controls the optical pickup 3 to keep the distance with the glass original 4 constant. In addition, the servo portion controls tracking and rotation driving of a spindle motor 5.

A record signal is supplied from an EFM modulator 12 to the optical modulator 2. Main digital data to be recorded is supplied from an input terminal 6. The main digital data is for example digital audio data of two-channel stereo. A sub code of channels P to W in accordance with the current CD standard is supplied from an input terminal 7. In addition, a frame sync is supplied form an input terminal 8.

The main digital data is supplied to a Cross Interleave Reed-Solomon Code (CIRC) encoder 9. The CIRC encoder 9 performs an error correction code encoding process and a scrambling process for the main digital data. The error correction code encoding process adds error correction parity data and so forth to the main digital data. In other words, 16 bits of one sample or one word is divided into high order eight bits and low order eight bits as two symbols. The error correction code encoding process and the scrambling process are performed in the unit of one symbol. The error correction code encoding process adds error correction parity data to each symbol in accordance with for example the CIRC system. As the error correction code, 24 symbols are encoded with a C2 code that is a Reed-Solomon code. As a result, a parity Q of four symbols is added to the 24 symbols. Thereafter, the 28 symbols are encoded with a C1 code that is a Reed-Solomon code. In addition, a sub code symbol of one symbols is added to the 32 symbols. A total of 33 symbols becomes data that composes one EFM frame. As described above, since the CIRC encoder 9 does not divide symbols in the unit of 24 symbols, an offset of four symbols takes place.

The sub code encoder 10 converts the sub code, which is input from the input terminal 7, into an EFM frame format sub code. An output of the CIRC encoder 9, an output of the sub code encoder 10, and the frame sync are supplied to the multiplexer 11. The multiplexer 11 arranges them in a predetermined sequence. Output data of the multiplexer 11 is supplied to the EFM modulator 12. The EFM modulator 12 converts an eight-bit symbol into 14-channel bit data in accordance with a conversion table. An output of the multiplexer 11 is supplied to a run-length controlling portion 13. The run-length controlling portion 13 controls the run length of the EFM modulated output of the EFM modulator 12. An output of the EFM modulator 12 is supplied to the optical modulator 2.

The EFM modulator 12 generates a record signal in the EFM frame format of the CD. The record signal is supplied to the optical modulator 2. The optical modulator 2 modulates the laser light corresponding to the record signal. The modulated laser beam exposes the photoresist on the glass master 4. By developing the glass master 4 and performing an electric plating process for the developed glass master 4, a metal master is produced. Thereafter, with the metal master, a mother disc is produced. Thereafter, with the mother disc, a stamper is produced. With the stamper, by the compression molding method, injection molding method, or the like, an optical disc is produced.

Figure 5:
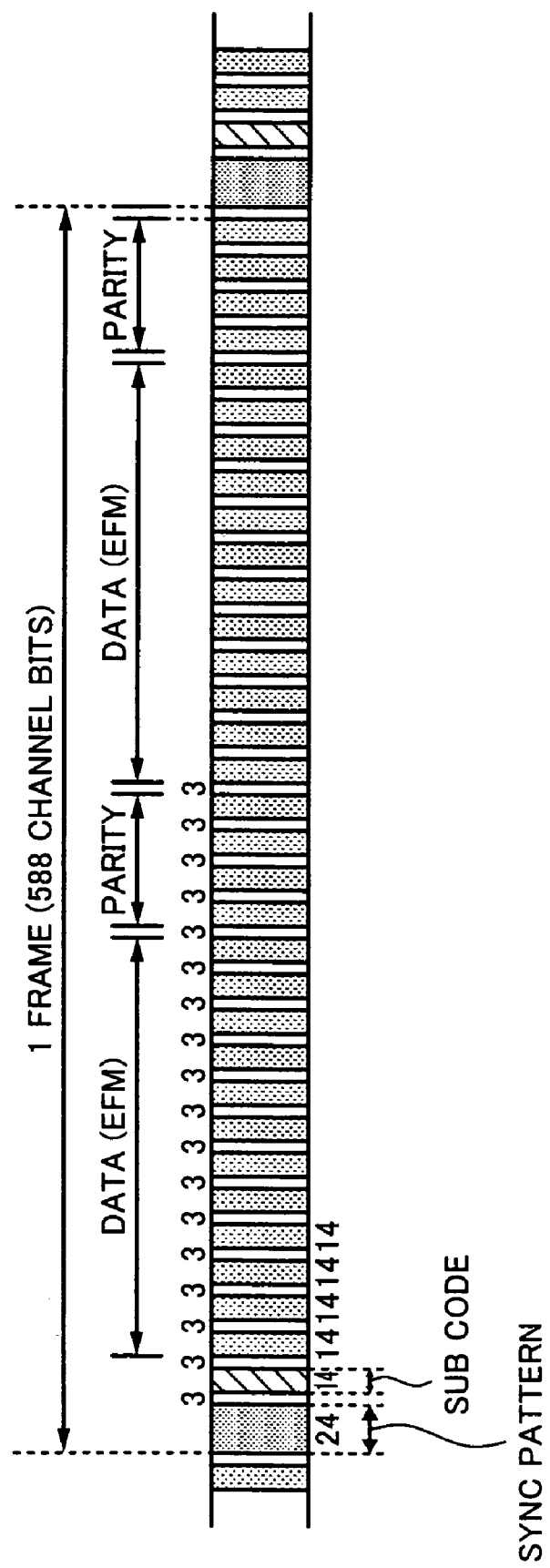
FIG. 5 is a schematic diagram describing an EFM frame format of a CD.

FIG. 5 shows a structure of data of one EFM frame of a CD. In the CD, with a total of 12 samples (24 symbols) of digital audio data of two channels, a parity Q and a parity P of four symbols each are formed. A total of 33 symbols (264 data bits) of which a sub code of one symbol is added to the 32 symbols are treated as one block. In other words, one frame that has been modulated in accordance with the EFM system contains a total of 33 symbols that are a sub code of one symbol, data of 24 symbols, a Q parity of four symbols, and a P parity of four symbols.

The EFM modulation system (eight to fourteen modulation: EFM) converts each symbol (eight data bits) into 14 channel bits. The minimum time period of the EFM modulation (the time period for which the number of bits whose values are 0 between two bits whose values are 1 of the record signal becomes minimum) Tmin is 3 T. The pit length for 3 T is 0.87 μm. The pit length equivalent to T is the minimum pit length. In addition, between two adjacent sets of 14 channel bits, three merging bits (also referred to as connection bits) are placed. In addition, a frame sync pattern is added at the beginning of the frame. When the period of a channel bit is denoted by T, the frame sync pattern has a period of 11 T, 11 T, and 2 T. In the EFM modulation rule, since such a pattern does not take place, the frame sync can be detected. One EFM frame is composed of a total of 588 channel bits. The frame frequency is 7.35 kHz.

98 EFM frames compose a sub code frame (or sub code block). The sub code frame, of which 98 frames are successively arranged in the vertical direction, is composed of a frame synchronous portion, a sub code portion, and a data and parity portion. The frame synchronous portion identifies the beginning of the sub code frame. The sub code frame is equivalent to $1/75$ second of a reproduction time of a regular CD.

The sub code portion is composed of 98 EFM frames. The first two frames of the sub code portion serve as both a synchronous pattern of the sub code frame and an EFM out-of-rule pattern. The sub code frame has bits corresponding to P, Q, R, S, T, U, V, and W channels.

The R channel to the W channel are used for a special purpose for displaying a still picture or so-called Karaoke's sub title. The P channel and the Q channel are used for controlling the track position of the pickup when digital data recorded on the disc is reproduced.

The P channel is used to record a signal whose value is "0" in the so-called lead-in area at the inner periphery of the disc and a signal whose value repetitively varies between "0" and "1" in a predetermined period in the so-called lead-out area at the outer periphery of the disc. In addition, the P channel is used to record a signal whose value is "1" at the boundary of two music programs in the program area formed between the lead-in area and the lead-out area of the disc and whose value is "0" in the other area. The P channel is used to access each music program when digital audio data is reproduced from the CD.

The Q channel is disposed to precisely control digital audio data recorded on the CD when the digital audio data is reproduced therefrom. One sub code frame of the Q channel is composed of a synchronous bit portion, a control bit portion, an address bit portion, a data bit portion, and a CRC bit portion.

Figure 6:
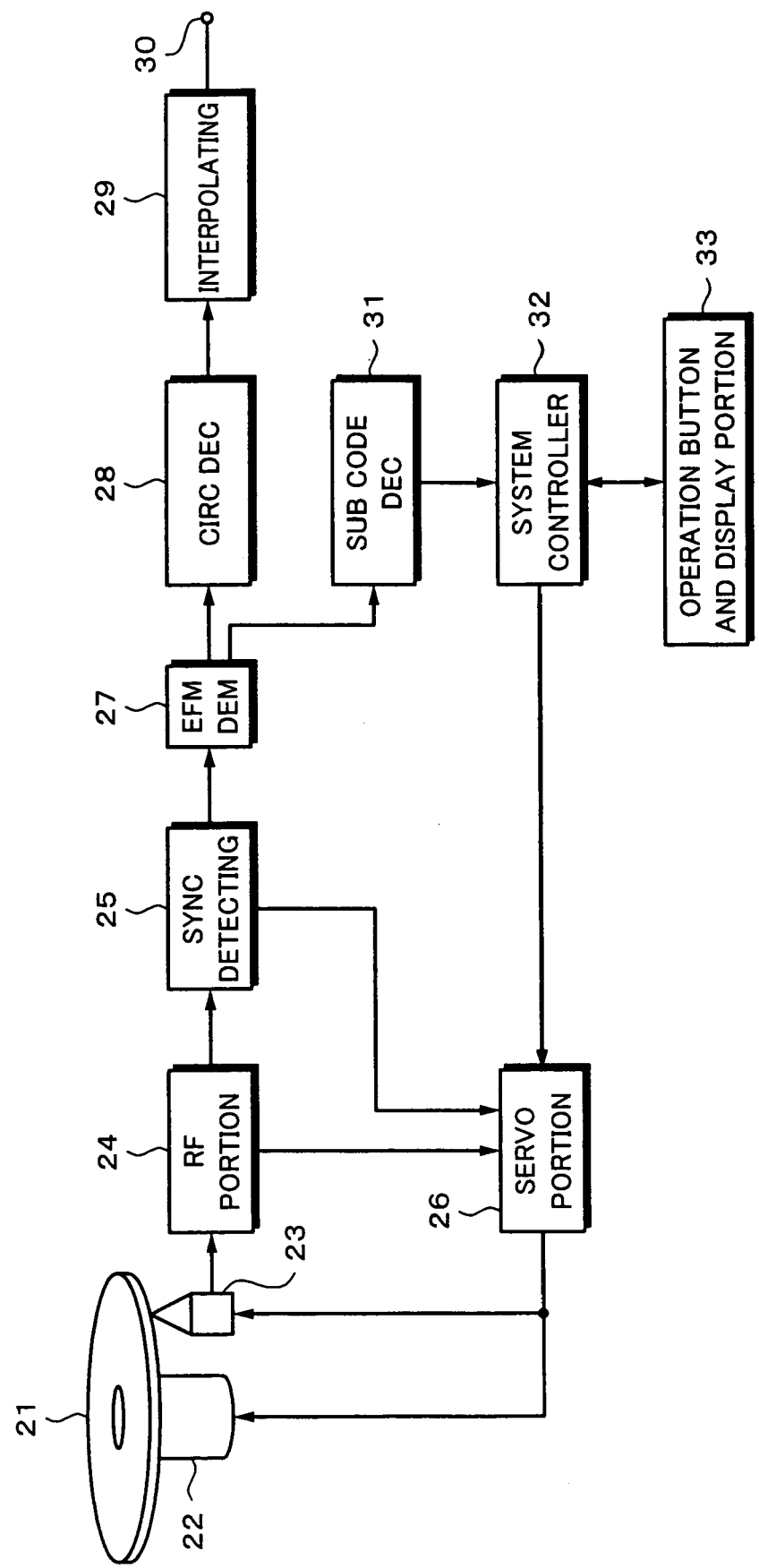
FIG. 6 is a block diagram showing a structure of a reproducing unit for a CD.

FIG. 6 shows an example of a structure of a reproducing unit that reproduces data from an optical disc that was produced by the foregoing mastering and stamping method. The reproducing unit has the same structure as a conventional player or drive. However, for easy understanding of the present invention, the structure of the reproducing unit will be described in the following. In FIG. 6, reference numeral 21 represents a disc produced by the mastering and stamping processes. Reference numeral 22 represents a spindle motor that drives the rotations of the disc 21. Reference numeral 23 represents an optical pickup that reproduces a signal from the disc 21. The optical pickup 23 comprises a semiconductor laser that irradiates laser light to the disc 21, an optical system such as an objective lens, a detector that receives reflected light from the disc 21, and a focus and tracking mechanism. The optical pickup 23 is moved in the radius direction of the disc 21 by a thread mechanism (not shown).

Output signals of for example a four-divided detector of the optical pickup 23 is supplied to an RF portion 24. The RF portion 24 calculates the output signals of the detector portions of the four-divided detector and generates a reproduction (RF) signal, a focus error signal, and a tracking error signal. The reproduction signal is supplied to a sync detecting portion 25. The sync detecting portion 25 detects a frame sync from the beginning of each EFM frame. The detected frame sync, the focus error signal, and the tracking error signal are supplied to a servo portion 26. The servo portion 26 controls the rotating operation of the spindle motor 22 and the focus servo and tracking servo of the optical pickup 23 in accordance with a reproduction clock of the RF signal.

Main data that is output from the frame sync detecting portion 25 is supplied to an EFM demodulator 27. The EFM demodulator 27 demodulates the main data in accordance with the EFM system. Main digital data that is output from the EFM demodulator 27 is supplied to a CIRC decoder 28. The CIRC decoder 28 corrects errors of the main digital data. An interpolating circuit 29 interpolates the error corrected data. The interpolated data is obtained as reproduction data from an output terminal 30. The sub code data that is output from the EFM demodulator 27 is supplied to a system controller 32.

The system controller 32 is composed of a microcomputer that controls the entire reproducing unit. In association with the system controller 32, an operation button and display portion 33 is disposed. The system controller 32 controls the servo portion 26 to access a desired position of the digital 21.

FIG. 7 shows a part of a conversion table. The EFM modulator 12 converts data bits of eight bits (sometimes referred to as data symbol) into channel bits of 14 bits (sometimes referred to as code symbol) in accordance with a rule described in the conversion table. In FIG. 7, data bits are denoted in hexadecimal notation (00 to FF), decimal notation (0 to 255), and binary notation. "1" of 14 bits of a code symbol represents a position at which a value is inverted. Since a data symbol is composed of eight bits, there are 256 patterns of code symbols. All code symbols of 14 bits each satisfy the EFM rule, of which the minimum time period (the time period for which the number of bits whose values are 0 between bits whose values are 1 of the record signal is minimal) Tmin is 3 T and the maximum time period (the time period for which the number of bits whose values are 0 between bits whose values are 1 of the record signal becomes maximal) Tmax is 11 T (hereinafter the EFM rule may be referred to as run length limit conditions).

When two code symbols of 14 bits each are connected, merging bits are required so as to satisfy the foregoing run length limit conditions of Tmin=3 T and Tmax=11 T. As merging bits, there are four types of patterns (000), (001), (010), and (100). Next, with reference to FIG. 8A to FIG. 8D, an example of which merging bits are used to connect two code symbols of 14 bits each will be described. The following example is described in "Compact Disc Book (3rd Rev.) (translated title)", published by Ohm-Sha Publishing Company, Mar. 25, 2001.

As shown in FIG. 8A, it is assumed that the preceding 14-bit pattern ends with (010) and the next data symbol is (01110111) (which is 77 in hexadecimal notation and 119 in decimal notation). The data symbol is converted into a 14-bit pattern (00100010000010). At timing t0, the preceding 14-bit pattern ends. At timing t1 after merging bits, the next 14-bit pattern starts. At timing t2, the next 14-bit pattern ends.

When (100) is used as one of four types of merging bits, since the condition of Tmin=3 T is not satisfied, this type of merging bits cannot be used. However, the other types of merging bits can be used. One type of merging bits is selected from the three types so that the DSV decreases. When the waveform is high, +1 is added to the DSV; when the waveform is low, −1 is added to the DSV. It is assumed that at timing t0, DSV is (−3).

FIG. 8B shows a waveform in the case that (000) is used as merging bits. In time period ($t_0$–$t_1$), the DSV is +3. In time period ($t_1$–$t_2$), the DSV is +2. Thus, at timing $t_2$, the DSV is (−3+3+2=+2). FIG. 8C shows a waveform in the case that (010) is used as merging bits. In time period ($t_0$–$t_1$), the DSV is −1. In time period ($t_1$–$t_2$), the DSV is −2. Thus, at timing $t_2$, the DSV is (−3−1−2=−6). FIG. 8D shows a waveform in the case that (001) is used as merging bits. In time period ($t_0$–$t_1$), the DSV is +1. In time period ($t_1$–$t_2$), the DSV is −2. Thus, at timing $t_2$, the DSV is (−3+1−2=−4). Consequently, when (000) is selected, at timing $t_2$, the DSV is +2, which is the closest to 0 in these types of merging bits. Thus, (000) is selected as merging bits.

A merging bit selecting portion is disposed in the EFM modulator 12 (see FIG. 4). As described above, the merging bit selecting portion selects types of merging bits that satisfies Tmin=3 and Tmax=11, which are the run length limit conditions for the EFM modulation. Among the selected types of merging bits, the merging bit selecting portion selects one of types of merging bits that causes the DSV to converge. According to the embodiment of the present invention, the run-length controlling portion 13 is disposed. Thus, even if a data pattern modulated by the conventional EFM modulator causes the DSV to increase and errors to take place in data that will be read, according to the present invention, the data pattern can be modulated in accordance with the EFM system in such a manner that the DSV does not increase. In other words, the run-length controlling portion 13 detects a case that the DSV becomes so large that errors will take place in data will be read and controls the merging bit selecting portion of the EFM modulator 12 to loosen the EFM run length limit conditions (for example, Tmin=3 and Tmax=11 to Tmin'=2 and Tmax'=12). Alternatively, the run-length controlling portion 13 may control the merging bit selecting portion to loosen only one of the run length limit conditions of Tmin and Tmax or Tmin'=1 and Tmax'=13.

Next, to describe the function of the run-length controlling portion 13, a predetermined data pattern shown in FIG. 9 will be considered. The predetermined data pattern causes the DSV to increase and prevent data form being normally reproduced when the run length is restricted FIG. 9 shows 24 symbols×8=192 symbol in hexadecimal notation. In FIG. 9, the horizontal direction is a chronological direction of record data. The last data symbol of 24 symbols of one row is followed by the first data symbol of 24 symbols of the next row. In FIG. 9, two adjacent symbols correspond to one sample (of 16 bits) of audio data. Four adjacent symbols correspond to stereo audio data (L and R). Thus, one row contains 12 samples. The 12 samples are placed in one EFM frame of the CD shown in FIG. 5.

In the structure shown in FIG. 4, the data shown in FIG. 9 is input to the input terminal 6. The CIRC encoder 9 encodes the data with a Reed-Solomon code and performs an interleaving process for the encoded data. The interleaved data is input to the multiplexer 11. The multiplexer 11 adds a sub code and a frame sync to the interleaved data. The multiplexer 11 outputs data shown in FIG. 10. Each row corresponds to one EFM frame (see FIG. 5). SY represents a frame synchronous signal. The frame synchronous signal SY is followed by a data symbol (81). The data symbol (81) corresponds to a sub code. Since the data shown in FIG. 10 has been interleaved, data symbols are varied from those shown in FIG. 9. The data shown in FIG. 10 is modulated in accordance with the EFM system by the EFM modulator 12.

The data pattern shown in FIG. 10 contains data symbols (81), (83), (8C), (98), (B8), (BA), (C9), (E2), and so forth. When these data symbols are converted into 14-bit code symbols in accordance with the EFM conversion table (see FIG. 7), the beginnings of the 14-bit code symbols are 0 T (the level immediately varies) or 1 T (the level varies 1 T later). The ends of the 14-bit code symbols are only 1 T.

On the disc, the data shown in FIG. 10 is repeatedly recorded in one record area of the data record area. The length of one record area is a length necessary for causing the DSV to deviate so as to accomplish a predetermined purpose (for example, the reproducing unit cannot correctly reproduce data from a copy disc). For example, the length of one record area is the length of three to five sub codes. According to the present invention, even if an offset takes place in the predetermined data, to securely cause the DSV to deviate, as shown in FIG. 2, record areas in which the predetermined data can be recorded with different offset compensation amounts that would take place are set. A plurality of record areas are set so that when an offset of four symbols takes place in the predetermined data shown in FIG. 9, 24 symbols recorded in each record area become different from each other.

Figure 11:
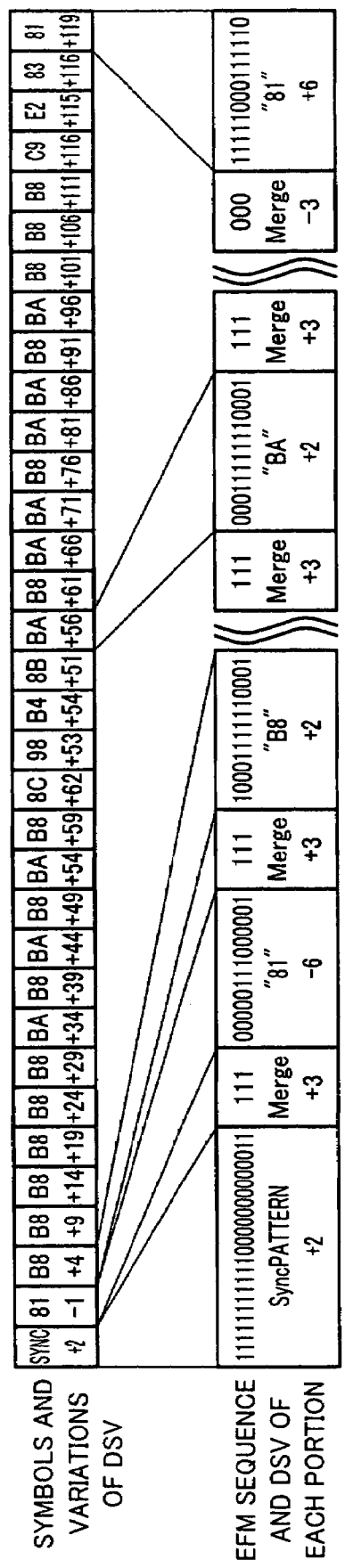
FIG. 11 is a schematic diagram showing the DSV and a part of a waveform in the case that the data shown in FIG. 10 has been modulated in accordance with the EFM system by a conventional method.

FIG. 11 shows the DSV that varies when data of the first row of FIG. 10 is modulated in accordance with the EFM system by the foregoing conventional encoder (EFM modulation) and a part of an EFM sequence. In FIG. 11, to illustrate a waveform. of the EFM sequence, "1" and "0" represent a high level and a low level, respectively.

Next, the EFM sequence shown in FIG. 11 will be described in detail. The frame synchronous signal is composed of a waveform of 11 T, an inverted waveform of 11 T, and a waveform of 2 T. Thus, the DSV of the frame synchronous signal is +2. The data symbol (81) of a sub code is converted into a code symbol (10000100100001) in accordance with the conversion table shown in FIG. 7. In the code symbol, at the beginning, the level varies. Thus, the DSV of the code symbol is −6. In accordance with the conventional merging bit selection rule, as merging bits that satisfy the run length limit conditions, (000) is selected. In other words, the other types of merging bits (100), (010), and (001) do not satisfy Tmin=3 T. As a type of merging bits that satisfies the run length limit conditions, (000) is unconditionally selected. As a result, in the merging bits, the level is not inverted. Thus, the DSV of the merging bits is +3. The DSV at the end of the code symbol into which the data symbol (81) has been converted is +2+3−6=−1.

The next data symbol (B8) is converted into a code symbol (01001000001001) in accordance with the conversion table shown in FIG. 7. The DSV of the code symbol is +2. In accordance with the conventional merging bit selection rule, as merging bits that satisfy the run length limit conditions, (000) is unconditionally selected. As a result, in the merging bits, the level is not inverted. Thus, the DSV of the merging bits is +3. The DSV at the end of the code symbol into which the data symbol (B8) has been converted is +2+3−6+3+2=+4.

The data symbol (BA) is converted into a code symbol (10010000001001) in accordance with the conversion table shown in FIG. 7. The DSV of the code symbol is +2. As merging bits that satisfy the run length limit conditions in accordance with the conventional merging bit selection rule, (000) is unconditionally selected. As a result, in the merging bits, the level is not inverted. The DSV of the merging bits is +3.

Thus, in the foregoing predetermined data pattern, since there is no room to select a type of merging bits, the function for controlling the DSV to converge does not work. As shown in FIG. 11, in one EFM frame, the DSV increases by 100 or more. As long as the data pattern continues, the DSV increases. After the data pattern ends and random data takes place, to cause the DSV to converge to 0, merging bits that cause the DSV to decrease are controlled. As a result, the DSV sharply decreases.

When a CD is produced with a record signal of which the foregoing predetermined data pattern has been encoded, since the DSV sharply increases, original data cannot be correctly read therefrom. In other words, even if data is reproduced from an original CD, the reproduced data is encoded by the conventional encoder, and then recorded to a medium such as a CD-R disc, data cannot be correctly read from the medium. As a result, data of the original CD can be copy-protected.

In addition, the permission and prohibition of the use of contents other than the predetermined data pattern can be controlled. In other words, the relevant data pattern portion can be reproduced from a disc produced by the encoder according to the present invention. In contrast, the relevant data pattern cannot be reproduced from an original disc produced by the conventional encoder. Thus, depending on whether or not the data pattern portion can be read, it can be determined whether or not the disc is an original disc or a copy disc. In accordance with the determined result, it can be determined whether or not the contents recorded in other than the data pattern portion can be used. As a result, the use of the contents of a copy disc can be prohibited.

From a view point of copy-protection, the predetermined data pattern of 192 symbols is repetitively recorded N times (where N is a positive integer larger than 1) in the program area of the disc. As described above, when it is determined whether or not the disc is an original disc or a copy disc depending on whether or not the data pattern portion can be reproduced, it is preferred to define the record positions of the data pattern portion. In addition, when the predetermined data pattern is recorded on a CD-ROM, data can be protected from being copied from the CD-ROM.

As shown in FIG. 4, according to the embodiment of the present invention, the run-length controlling portion 13 is disposed. The run-length controlling portion 13 pre-reads data to be modulated in accordance with the EFM system and detects the predetermined data pattern that causes the DSV disperses when it is modulated in accordance with the EFM system (see FIG. 9). Alternatively, the DSV of the EFM modulated output may be detected. The predetermined data pattern can be detected by the pattern mapping method, comparing the absolute value of the DSV with a threshold value, detecting whether the absolute value of the DSV exceeds a threshold value, and determining whether or not the absolute value of the DSV exceeds a threshold value in a predetermined number of symbols. The run-length controlling portion 13 controls the EFM modulator 12 to select one type of merging bits that satisfies the run length limit conditions of Tmin=3 T and Tmax=11 T when the predetermined data pattern is not detected. The run-length controlling portion 13 loosens the run length limit conditions of for example Tmin'=2 T and Tmax'=12 T when the run-length controlling portion 13 detects the predetermined data pattern. As a result, a type of merging bits can be selected so that the DSV decreases.

Figure 12:
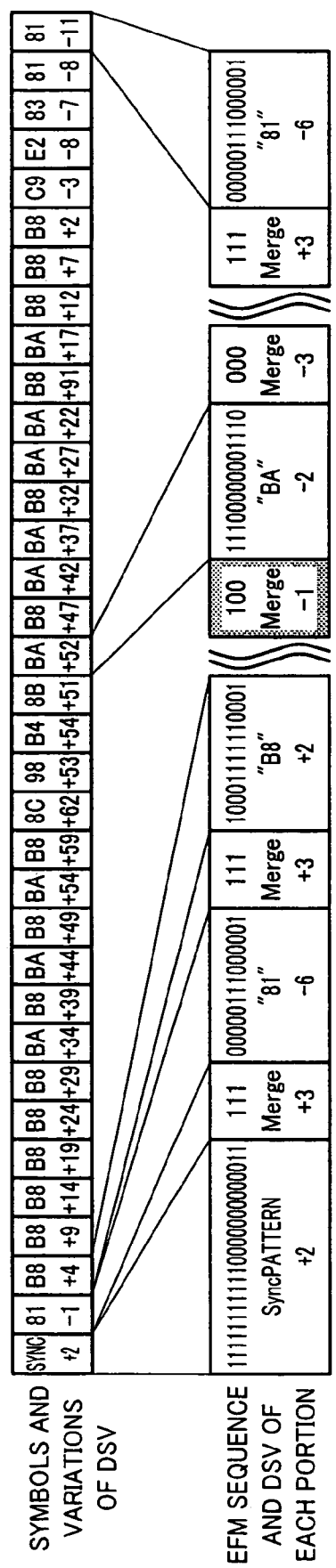
FIG. 12 is a schematic diagram showing the DSV and a part of a waveform in the case that the data shown in FIG. 10 has been modulated in accordance with the EFM system by the method according to the present invention.
Figure 15:
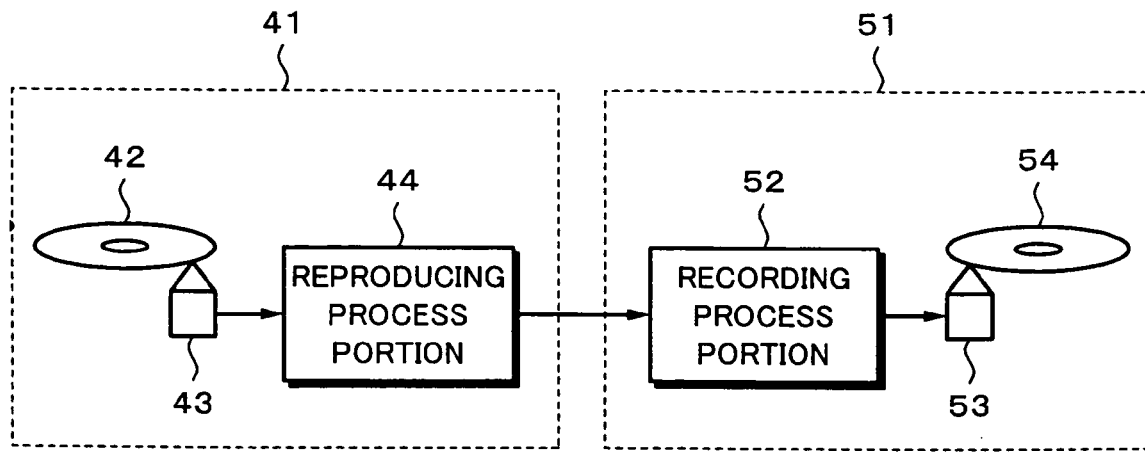
FIG. 15 is a block diagram describing a flow of a copying operation for a disc.
Figure 16:
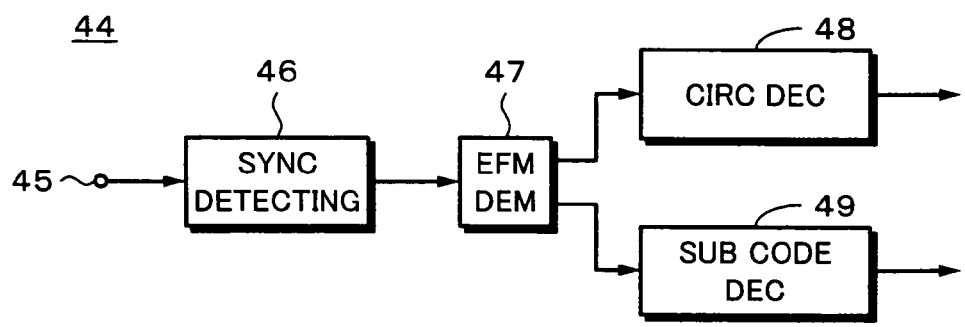
FIG. 16 is a block diagram showing an outline of a conventional reproducing process portion.
Figure 17:
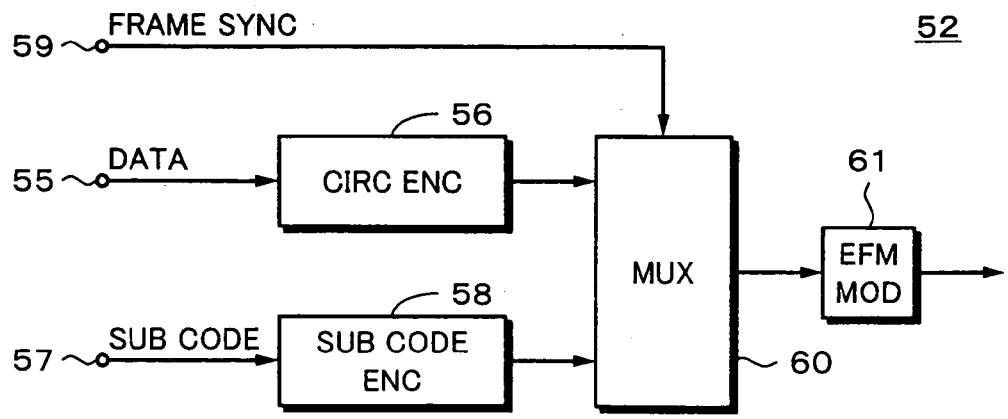
FIG. 17 is a block diagram showing an outline of a conventional recording process portion.

FIG. 12 shows the DSV that varies when data of the first row shown in FIG. 10 is modulated in accordance with the EFM system and a part of an EFM sequence. For example, it is assumed that when the DSV of the data symbol (BA) is +56 in the conventional run length limit conditions, the predetermined data pattern is detected. In this case, when the data symbol is encoded by the conventional encoder, as described with reference to FIG. 11, at the end of the preceding 14-bit code symbol (8B), the level is inverted of 1 T. At the beginning of the next code symbol (BA), the level is inverted. Thus, only (000) can be selected as a type of merging bits. As a result, the DSV does not decrease. However, according to the embodiment, since the run length limit condition is loosened to Tmin'=2 T, not only (000), but (010) can be selected as types of merging bits. In this case, in a total of four channel bits of the last channel bit of the preceding code symbol (8B) and the merging bits, a waveform of 2 T (denoted by 11) and a waveform of 2 T (denoted by 00) take place.

When the type (010) is selected as merging bits, the level is inverted in the merging bits unlike the type (000). Thus, after the next code symbol (BA), the level is inverted unlike the case shown in FIG. 11. As a result, even if the run length limit conditions are restored to the original conditions, as shown in FIG. 12, the DSV can be controlled so that it converges to 0. When the DSV diverges in the minus direction (not shown), by loosening the run length limit conditions, the DSV converges.

When the predetermined data pattern is successively input, only by substituting the foregoing merging bits, the DSV would not be prevented from slightly increasing or decreasing. However, the slight increase or decrease of the DSV does not largely affects data reproduced from the CD. When the DSV has been stored in the EFM modulator 12, after the predetermined pattern ends, a type of merging bits can be freely controlled. At that point, the EFM modulator 12 would cause the DSV to abruptly return to 0. As a result, the DSV would sharply vary. Such a situation is not suitable for reproduction of data.

To prevent the DSV from sharply varying, after the predetermined data pattern ends, in the state that a type of merging bits can be selected, the run-length controlling portion 13 outputs a command that causes the EFM modulator 12 to clear the DSV to 0. Thus, after the predetermined data pattern causes the DSV to cumulatively vary, the operation that causes the DSV to converge to 0 is not performed. As a result, the DSV can be prevented from abruptly varying.

FIG. 13 shows another example of the predetermined data pattern. In the example, data symbols (BB), (FA), (FB), and so forth are used. When these data symbols are converted into 14-bit code symbols, the results of (BB)= (10001000001001), (FA)=(10010000010010), and (FA)= (10001000010010) are obtained.

FIG. 14 shows the result of which the data shown in FIG. 13 has been encoded by the CIRC encoder and then a frame synchronous signal and a sub code are added to the encoded data. In FIG. 14, each row corresponds to data of one EFM frame. The data shown in FIG. 14 is modulated in accordance with the EFM system. Like the foregoing data pattern, when the other data pattern is encoded by the conventional encoder, the DSV increases. In contrast, when the other data pattern is encoded by the encoder according to the present invention, the DSV can be prevented from increasing.

The present invention is not limited to the foregoing embodiment. In other words, various modifications and ramifications of the foregoing embodiment are available without departing from the spirit and scope of the present invention. The foregoing example describes copy protection. Alternatively, data that causes the DSV to deviate may be intentionally recorded on an original disc so as to record information such as disc identification information. In addition, the present invention can be applied to the EFM Plus system as another modulating system other than the EFM system. The EFM Plus system converts eight-bit data symbols into 16-bit code symbols without use of merging bits. In the EFM Plus system, since there is a predetermined data pattern that causes the DSV to increase, when an encoder having a table that is modified from the standard code conversion table is used, the encoder is capable of preventing the predetermined data pattern from causing the DSV to increase. Thus, it can be determined whether or not the current disc is an original disc produced by the encoder according to the present invention or a copy disc produced by the conventional encoder.

The present invention can be applied to a multi-session optical disc on which for example CD-DA format data and CD-ROM format data are recorded. As information recorded on an optical disc, various types of data such as audio data, video data, still picture data, text data, computer graphic data, game software, and computer programs can be recorded. Thus, the present invention can be applied to for example DVD video discs and DVD-ROM discs. In addition, the present invention can be applied to card type data recording mediums as well as disc type data recording mediums.

As is clear from the foregoing description, according to the present invention, when an offset takes place in the error correction code encoder, it can securely prevent the operation that causes the DSV to deviate from being disabled. Thus, when content data is reproduced form a copy disc that is a copy disc of an original disc, the desired object of which since the DSV deviates, data cannot be correctly reproduced can be accomplished.

The invention claimed is:

1. A data recording medium on which data encoded with an error correction code is digitally modulated and recorded,
    wherein predetermined data contained in a part of data to be recorded is data that switchably causes DSV to deviate,
    wherein data of which the predetermined data has been encoded with the error correction code and modulated is recorded a plurality of times at different start positions,
    wherein the encoded data is digitally modulated by generating record data whose run length is restricted,
    wherein when the run length is restricted, the predetermined data is a data pattern that causes the record data whose DSV deviates to be generated so as to prevent data from being normally reproduced, and
    wherein when selected data is inserted into the predetermined data in such a manner that a run length restriction condition is loosened, the predetermined data is a data pattern that causes the record data whose DSV does not diverge to be generated.

2. The data recoding medium as set forth in claim 1,
    wherein a plurality of merging bits are placed at a boundary of adjacent code symbols,
    wherein the merging bits have a plurality of bit patterns,
    wherein when the predetermined data is not detected, a bit pattern that satisfies the run length restriction condition is selected as merging bits from the plurality of bit patterns, and
    wherein when the predetermined data is detected, in the state that the run length restriction condition is loosened, the selected bit pattern is recoded as the merging bits.

3. A data recording method for digitally modulating data encoded with an error correction code and recording the digitally modulated data on a data recording medium, the method comprising the steps of:
    inserting predetermined data that switchably causes DSV to deviate into data to be recorded,
    recording data of which the predetermined data has been encoded with the error correction code and modulated a plurality of times at different start positions,
    wherein the encoded data is digitally modulated by generating record data whose run length is restricted,
    wherein when the run length is restricted, the predetermined data is a data pattern that causes the record data whose DSV deviates to be generated so as to prevent data from being normally reproduced, and
    wherein when selected data is inserted into the predetermined data in such a manner that a run length restriction condition is loosened, the predetermined data is a data pattern that causes the record data whose DSV does not diverge to be generated.

4. The data recoding method as set forth in claim 3,
    wherein a plurality of merging bits are placed at a boundary of adjacent code symbols,
    wherein the merging bits have a plurality of bit patterns,
    wherein when the predetermined data is not detected, a bit pattern that satisfies the run length restriction condition is selected as merging bits from the plurality of bit patterns, and
    wherein when the predetermined data is detected, in the state that the run length restriction condition is loosened, the selected bit pattern is recoded as the merging bits.

5. A data recording apparatus for digitally modulating data encoded with an error correction code and recording the digitally modulated data on a data recording medium, the apparatus comprising:

means for inserting predetermined data that switchably causes DSV to deviate into data to be recorded, and means for recording data of which the predetermined data has been encoded with the error correction code and modulated a plurality of times at different start positions, wherein the encoded data is digitally modulated by generating record data whose run length is restricted, wherein when the run length is restricted, the predetermined data is a data pattern that causes the record data whose DSV deviates to be generated so as to prevent data from being normally reproduced, and wherein when selected data is inserted into the predetermined data in such a manner that a run length restriction condition is loosened, the predetermined data is a data pattern that causes the record data whose DSV does not diverge to be generated.

6. The data recoding apparatus as set forth in claim 5, wherein a plurality of merging bits are placed at a boundary of adjacent code symbols, wherein the merging bits have a plurality of bit patterns, wherein when the predetermined data is not detected, a bit pattern that satisfies the run length restriction condition is selected as merging bits from the plurality of bit patterns, and wherein when the predetermined data is detected, in the state that the run length restriction condition is loosened, the selected bit pattern is recoded as the merging bits.

* * * * *